United States Patent
Yerazunis et al.

(10) Patent No.: US 9,481,131 B2
(45) Date of Patent: *Nov. 1, 2016

(54) METHOD AND APPARATUS FOR PRINTING 3D OBJECTS USING ADDITIVE MANUFACTURING AND MATERIAL EXTRUDER WITH TRANSLATIONAL AND ROTATIONAL AXES

(71) Applicant: Mitsubishi Electric Research Laboratories, Inc., Cambridge, MA (US)

(72) Inventors: William S Yerazunis, Acton, MA (US); John C Barnwell, III, Leominster, MA (US); Joseph Katz, Stony Brook, NY (US); Dirk Brinkman, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/945,223

(22) Filed: Jul. 18, 2013

(65) Prior Publication Data

US 2015/0021830 A1    Jan. 22, 2015

(51) Int. Cl.
*G06K 9/00* (2006.01)
*B29C 67/00* (2006.01)
*G06F 17/50* (2006.01)

(52) U.S. Cl.
CPC ....... *B29C 67/0055* (2013.01); *B29C 67/0085* (2013.01); *G06F 17/50* (2013.01); *G06F 17/5009* (2013.01); *G06F 17/5018* (2013.01);

(Continued)

(58) Field of Classification Search
CPC ........... G06F 17/5018; G06F 2217/16; G06F 17/50; G06F 17/5009; G06F 17/5086
See application file for complete search history.

(56) References Cited

U.S. PATENT DOCUMENTS 4,998,873 A * 3/1991 Martin et al. ............. 425/541
8,021,138 B2    9/2011 Green (Continued)

FOREIGN PATENT DOCUMENTS

| WO | 2005070657 A1 | 8/2005 |
| WO | 2011011818 A1 | 3/2011 |
| WO | 2013064826 A1 | 5/2013 |

OTHER PUBLICATIONS

Stava et al., Stress Relief: Improving Structural Strength of 3D Printable Objects, 2012, ACM Transactions on Graphics, vol. 31, No. 4, Article 48, pp. 48:1-48:11.*

(Continued)

*Primary Examiner* — Stephen R Koziol
*Assistant Examiner* — Jonathan S Lee
(74) *Attorney, Agent, or Firm* — Gene Vinokur; James McAleenan; Hironori Tsukamoto

(57) ABSTRACT

A 5D printer, which additively manufactures an object, includes an extruder that can move linearly along three orthogonal axes and rotationally around at least one of the axes with respect to the object while depositing a material. A gantry is movable along X, Y and Z axes, and a trunnion table movable about A and B axes is mounted on the gantry. A platen is mounted on the trunnion table, and the extruder deposits the material on the platen while moving the gantry and trunnion table. A model of the object is analyzed to produce a stress tensor for the object, and the depositing is according to the stress tensor.

24 Claims, 7 Drawing Sheets

(52) U.S. Cl.
CPC ....... *G06F 17/5086* (2013.01); *G06F 2217/16* (2013.01)

(56) References Cited

U.S. PATENT DOCUMENTS

| | | | |
|---|---|---|---|
| 2008/0109103 A1 | 5/2008 | Greshenfeld | |
| 2012/0053716 A1* | 3/2012 | Bickel et al. | 700/98 |
| 2012/0251688 A1 | 10/2012 | Zimmerman et al. | |
| 2014/0252668 A1* | 9/2014 | Austin et al. | 264/40.7 |

OTHER PUBLICATIONS

Lu et al., Tensile Strength Characteristics of Unsaturated Sands, 2007, J. Geotech. Geoenviron., vol. 133, No. 2, pp. 144-154.*

Mobasher et al., Mechanics of Fiber and Textile Reinforced Cement Composites, 2011, CRC Press, p. 13.*

The Engineering Toolbox, "Concrete Properties", http://www.engineeringtoolbox.com/concrete-properties-d_1223.html.*

Le, Thanh T., et al. "Hardened properties of high-performance printing concrete." Cement and Concrete Research 42.3 (2012): 558-566.*

Shoshiroda, T., Anisotropy of Concrete, 1972, Proceedings of Conference on Mechanical Behaviour of Materials, pp. 300-307.*

Stava, O., Vanek, J., Benes, B., Carr, N., & Měch, R. (2012). Stress relief: improving structural strength of 3D printable objects. ACM Transactions on Graphics (TOG), 31(4), 48.*

Ahn et al. "Anisotropic Material Properties of Fused Deposigion Modeling ABS." Emerald, Rapid Prototyping. vol. 8, No. 4, 2002. pp. 248-257. ISSN: 1355-2546.

Bagsik et al. "Mechanical Properties of Fused Deposition Modeling Parts Manufactured with ELtem*9085." ANTEC 2011, Boston, MA.

Constance Ziemian, Mala Sharma and Sophia Ziemian (2012). Anisotropic Mechanical Properties of ABS Parts Fabricated by Fused Deposition Modelling, Mechanical Engineering, Dr. Murat Gokcek (Ed.), ISBN: 978-953-51-0505-3, InTech, Available from: http://www.intechopen.com/books/mechanical-engineering/anisotropicmechanical-properties-of-abs-parts-fabricated-by-fused-deposition-mocleling.

* cited by examiner

US 9,481,131 B2

METHOD AND APPARATUS FOR PRINTING 3D OBJECTS USING ADDITIVE MANUFACTURING AND MATERIAL EXTRUDER WITH TRANSLATIONAL AND ROTATIONAL AXES

RELATED APPLICATION

This application is related to U.S. application Ser. No. 13/945,245 cofiled herewith and incorporated by reference.

FIELD OF THE INVENTION

This invention relates generally to additive manufacturing, and more particularly to printing three-dimensional (3D) objects using material extruders with translational and rotational degrees of freedom.

BACKGROUND OF THE INVENTION 3D printing is an additive manufacturing process for making three-dimensional objects of arbitrary shapes from digital models. In 3D printing, successive layers of a material are laid down adjacently to form the objects. Typically a round or ribbon like material is extruded through a movable nozzle.

U.S. Pat. No. 5,121,329 describes fusion deposition modeling, wherein an extruder is moved in a rectangular coordinate system while producing a stream or ribbons of melted thermoplastic material. The ribbons are laid down adjacent to each other to produce layers that fill the volume of the desired object.

U.S. Pat. No. 5,866,058 describes controlling a local environment to maintain the extruded material below a solidification temperature, and above a creep relaxation temperature while making objects.

Generally, objects produced by prior art methods have the undesirable property of severe anisotropic tensile strength variation. The individual ribbons of melted thermoplastic have an axial strength close to the bulk strength of the material, but inter-ribbon and inter-layer bonding strengths vary greatly.

For example as shown in FIG. 1 for injection-molded acrylonitrile butadiene styrene (ABS), the individual ribbon axial tensile strength is about 30 Mega Pascal (MPa), with a 45/−45 degree crisscross and a 0/90 orientation composite at around 20 MPa, and a traverse (ribbon to ribbon) strength of about 2 MPa, or about 1/15th of the ribbon's axial strength.

Special polymers, such as ABS functionalized with polymethylmethacrylate (PMMA) as described in U.S. 20090295032 can improve the bonding. High cost materials, such as polyetherimides, can produce parts with a minimum strength of 35 MPa in the inter-layer bond strength and with a maximum of 90 MPa as the individual ribbon tensile strength, which is a 2:1 strength discrepancy, but still far better than the 15:1 ratio of the conventional ABS.

U.S. Pat. No. 5,906,863 describes adding short fibers to a thermosetting mixture, such as a ceramic slurry, to produce a "green part" with oriented fibers. A specific method to control the orientation is not described.

Most prior art 3D printers are based on a three degree of freedom linearly orthogonal (XYZ) manipulation of the work piece and extruder.

Some 3D printers use rotating discs or a cylinder as a support base, see WO 2011/011818, in order to provide a more uniform surface for spreading of powder that will later be glued, solvent-bonded, or laser-sintered.

SUMMARY OF THE INVENTION

A 5D printer, which additively manufactures an object, includes an extruder that can move linearly along three orthogonal axes and rotationally around at least one of the axes with respect to the object while depositing a material.

A gantry is movable along X, Y and Z axes, and a trunnion table movable about A and B axes is mounted on the gantry. A platen is mounted on the trunnion table, and the extruder deposits the material on the platen while moving the gantry and trunnion table.

A model of the object is analyzed to produce a stress tensor for the object, and the depositing is according to the stress tensor.

DETAILED DESCRIPTION OF THE PREFERRED EMBODIMENTS

The embodiments of our invention provide a printer for producing three-dimensional (3D) objects using additive manufacturing. As an advantage, the objects have high tensile strengths oriented along high-strain direction of the objects when in use.

Stress Based Design

Figure 1:
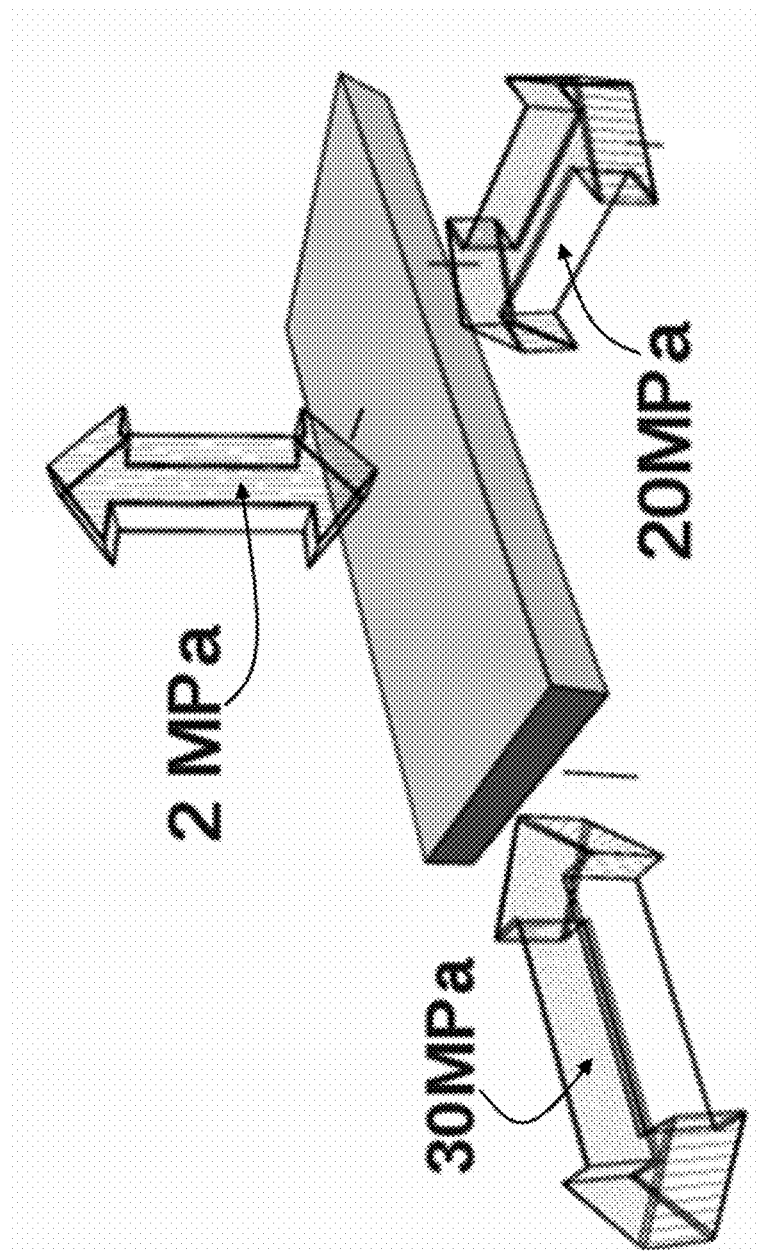
FIG. 1 is a schematic of conventional anisotropic tensile strength characteristics of extruded materials used by prior art 3D printers.
Figure 2:
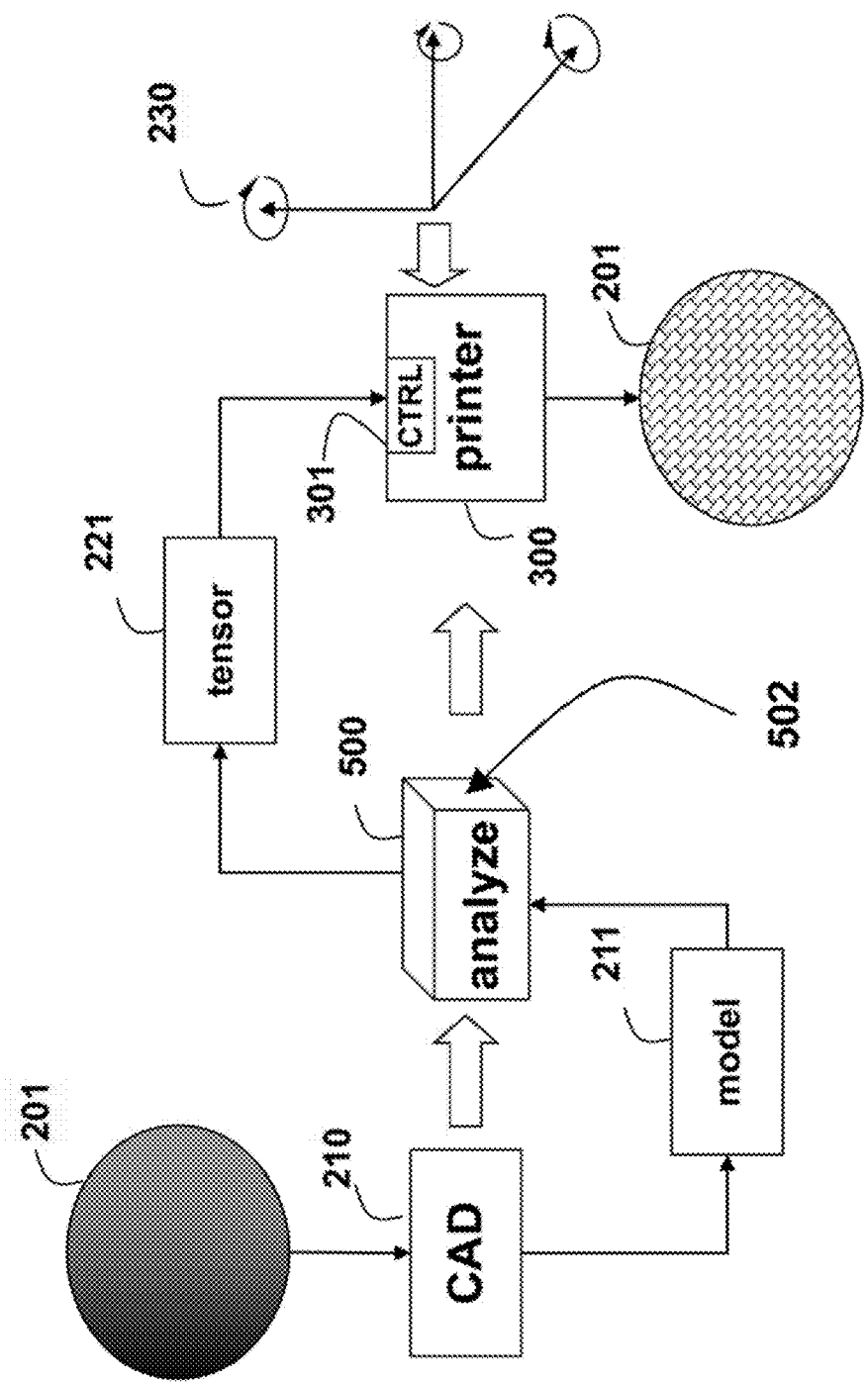
FIG. 2 is a flow diagram of a method for additive manufacturing according to embodiments of the invention.

As shown in FIG. 2 for one embodiment, a computer aided design (CAD) module 210 is used to generate a model 211 of an example 3D (spherical) object 201. The model is analyzed 500 to determine distributions of stresses that may be present when the object is in use. The result of the analysis is a volumetric stress tensor 221, for example.

$$\begin{bmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \end{bmatrix} \text{ or } \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix}$$

depending on whether coordinates of the tensor are numbered $x_1, x_2, x_3$, or simply labeled x, y, z. The tensor is used to control motions 230 of a printer 300 and the extrusion velocity according to embodiments of the invention. The CAD and the analyzing can be performed by a processor 502 connected to memory and input/output interfaces as known in the art.

As an advantage, the printer uses 3D linear translation motions along orthogonal axes, and angular rotational motions about the axes A and B, for up to 3D of orientations, to achieve the desire tensile strength corresponding to the volumetric stress tensor 221. The motion is determined by a controller 301 running a single stream of G-code. G-code is the most widely used numerical control (NC) programming, language. The G-code directs the printer to make the object defined by instructions that move the extruder relative to a support base and the object using predetermined locations and velocities.

Printer

Figure 3:
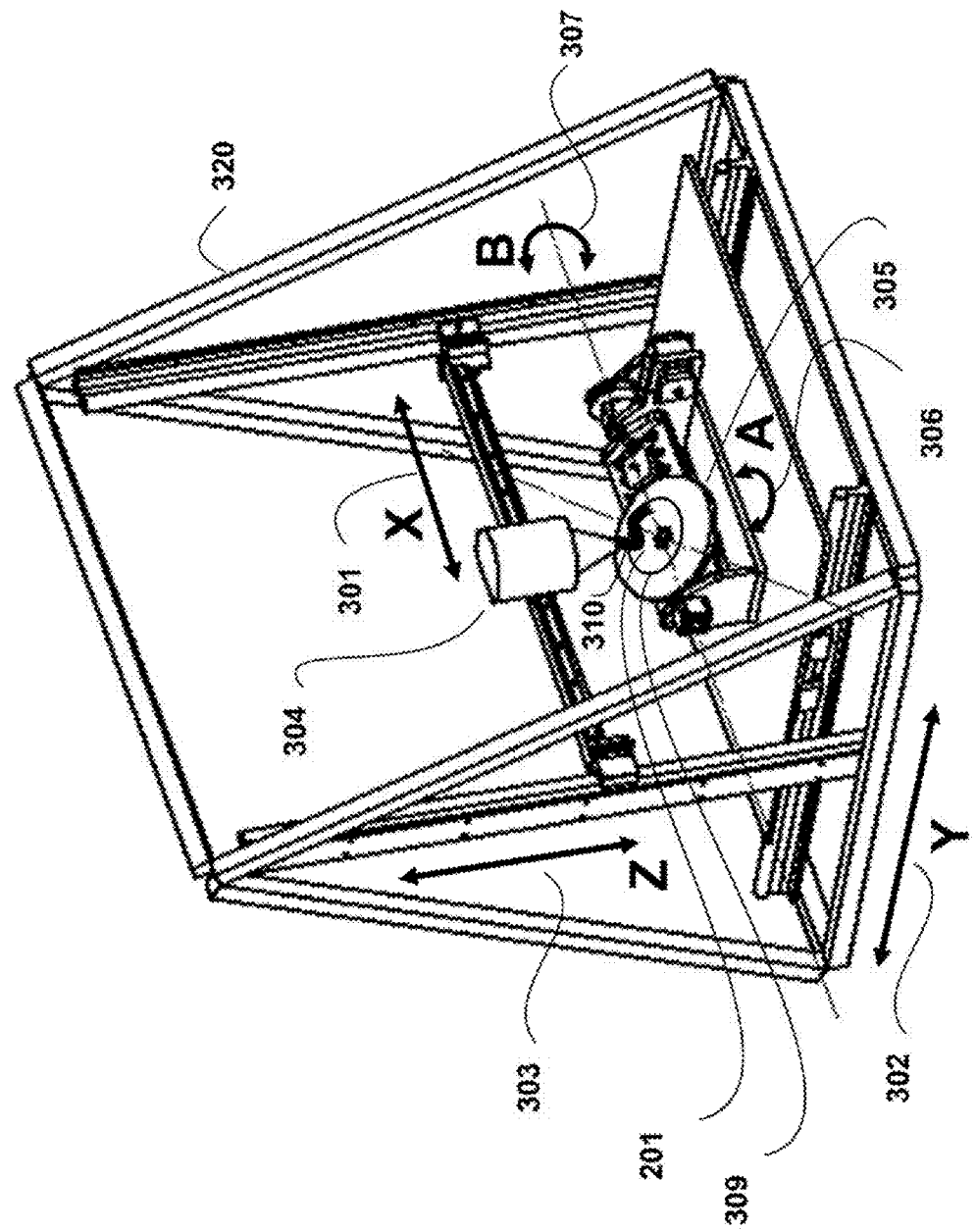
FIG. 3 is a schematic of a 5D printer according to embodiments of the invention.

FIG. 3 shows one embodiment of a five degree of freedom (5D) printer. The linear horizontal axis X 301 and Y 302 and vertical axis Z 303 of a movable gantry 320 are used to position an extruder 304 in relation to a The apparatus en 305. The platen 305 can be rotated and tilted about two rotational axes A 306 and B 307, using conventional G-code notation "A" and "B" for angles. The assembly of crossed axes A and B are often referred to as a "two axis trunnion table" or simply as a "trunnion table" in the field of machine tooling.

The object 201 is constructed by feeding a ribbon of material 310 through the extruder, and depositing a disposable support 309 on the platen. Then, the object can be deposited on the disposable support. The disposable support is generally constructed of a very sparse laydown of ribbons of the material designed to easily break free of the object when the manufacturing is completed. In other words, it is ideal for the support to be frangible. The disposable support is of sufficient thickness to allow the extruder to reach a full 360° hemispherical approach to the object 201.

By moving the extruder linearly along the X, Y and Z axes, and angularly about the A and B axes, the extruder can, achieve any desired position and angle with respect to the object, and thus the ribbon of extruded material 310 with any desired axis orientation can be deposited on the object.

It is understood that the object can be manufactured by the printer in many different orientations. However, some orientations may be preferred due to a reduction in the required thickness of the support.

As an example of this process, consider a nonuniformly stressed flat plate. If the stress analysis of the flat plate indicates that the tensile loading in a particular area of the material is 10 MPa in the east-west direction, 5 MPa in the north-south direction, and zero in the up-down direction, then an optimal material laydown would be two ribbons east-west, followed by one ribbon north-south, then two ribbons east-west, followed by one ribbon north-south, and so repeated until the desired material thickness was obtained. Other simple patterns can be used for other shapes.

Example

Pressure Tank

Figure 4:
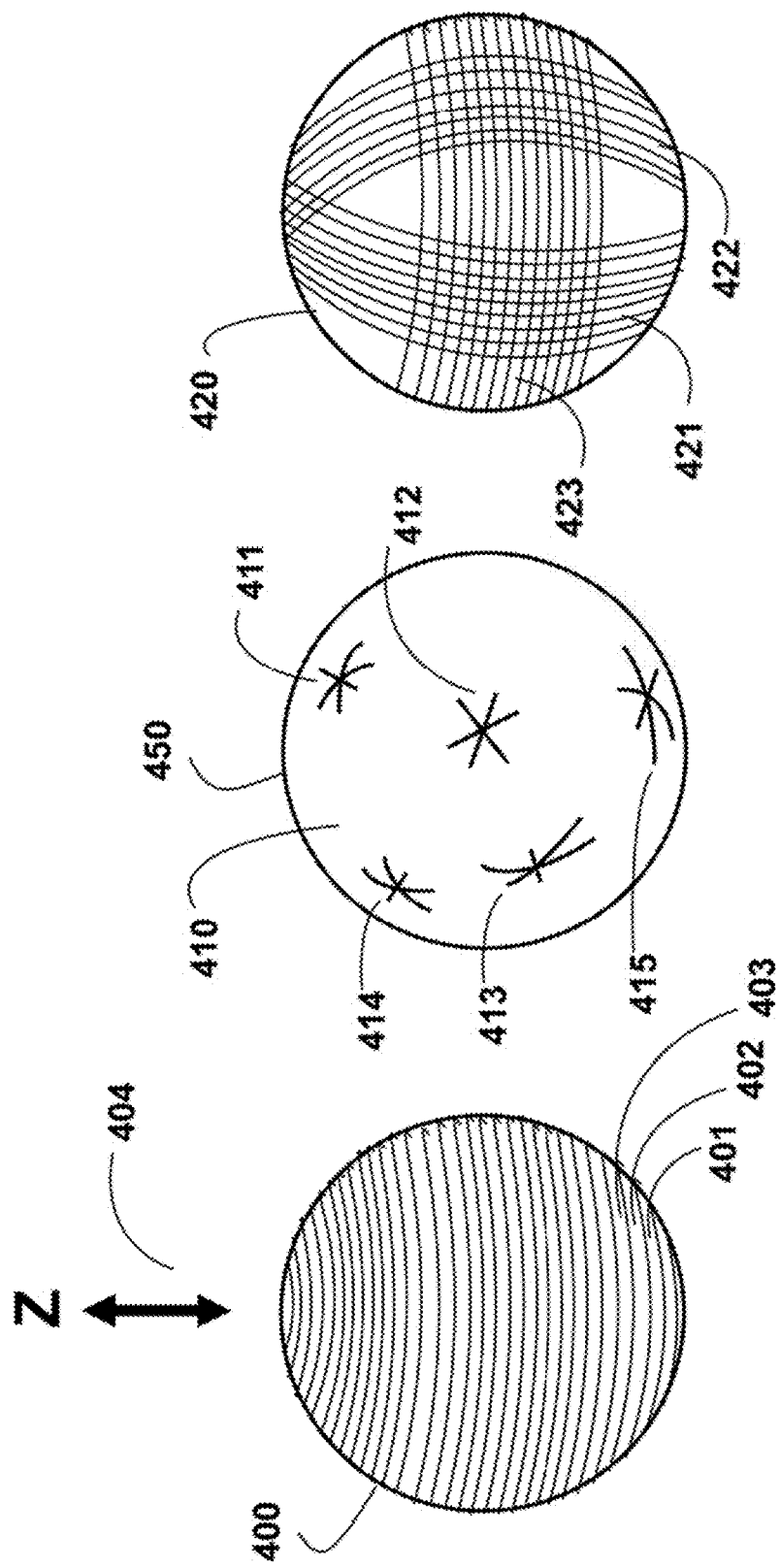
FIG. 4A is a schematic of a prior art material pattern according to embodiments of the invention.
FIGS. 4B and 4C are schematics of material patterns according to embodiments of the invention.

As shown in FIGS. 4A, 4B and 4C, a more interesting example object is a spherical pressure tank. For ease of this description, we ignore access holes and mounting hardware.

From a local perspective of a small part of tank wall material, each neighborhood looks identical. The stress tensor indicates that each small volume of tank wall is subject to uniform tension in all directions perpendicular to the radial direction of the tank. However, from a global perspective of view, the stress tensor varies with the latitude and longitude of each small volume of tank material.

As shown in FIG. 4A, a patch at the "north pole" of the spherical tank experiences forces that are well-accommodated by an XY laydown path of a conventional XYZ 3D printer. However, the equator of the spherical tank is subject to a large tensile stress in the Z direction 404, which is as noted above as being very weak in a conventional 3D printer. This is because a conventional XYZ 3D printer cannot lay down a ribbon aligned with the Z axis. Thus, the spherical tank printed on a conventional 3D printer has a weak equator and may rupture at the equator when subject to overpressure. Naïve solutions would make the equator material, thicker, e.g., ten times thicker is required for ABS, or make the pressure tank asymmetrical, e.g., longer along the Z axis.

However, in a better solution for a maximum strength tank, each section of the tank should be mostly composed of radial ribbons, each perpendicular to the radial "out" direction of the tank. The entire tank surface can be tessellated by geometric dispersions of these radial ribbon patterns, i.e. a regular and abstract regular polyhedra, as well as geometric dispersions produced by geodesic means. This greatly improves the tensile strength of the tank.

It is impossible for a conventional three degree of freedom XYZ printer to achieve the orientations needed to lay down this ribbon patterns. However, the 5D printer as described herein, with translation of the extruder along the XYZ axes, and rotation of the object along the A and B axes is able to produce a pressure tank with near optimal strength to weight ratio, and near constant wall thickness.

FIG. 4A shows the conventional arrangement of the ribbon material for a spherical pressure tank 400 constructed by a conventional 3D printer. Layers 401, 402, 403, etc. are "weakly" attached in the Z 404 direction, giving about a 2 MPa tensile limit in the material in the Z direction, 2 MPa is approximately 300 PSI, so if the pressure vessel had an interior cross section of 1 square inch for the contained pressurized fluid, and an equatorial annulus cross section also of one square inch, we would expect the vessel to rupture in the Z direction at a pressure of approximately 300 PSI.

FIG. 4B shows one embodiment for the ribbon extrusion of a spherical pressure vessel 450. First, an interior shell 410, one ribbon thick, is deposited by the extruder. Then, a sequence of radial ribbon asterisk shapes 411-415 are printed directly by using the 5D printer 300. Each asterisk has an optimal strength ribbon laydown pattern for the pressure induced stress at that local area of the spherical pressure vessel. The optimal placement and order of printing these radial ribbon patterns can be determined stochastically or deterministically.

For example, the first radial ribbon pattern 411 can be printed anywhere on the surface. The second pattern can be printed anywhere that does not overlap the first one. Preferably, to minimize movement time, the pattern should be the nearest pattern that does not overlap the first pattern. This "nearest not overlapping" selection method continues until no more non-overlapping patterns can be printed. Then, all of the printed patterns are removed from consideration, and another randomly selected pattern is selected and printed. The "nearest not overlapping" selection method iterates until all of the desired patterns are placed on the surface. Assuming on-axis maximum yield strength, we anticipate that the same one-square-inch payload cross section, one square inch annulus strength, of between 20 and 30 MPa, or about 3000 to 4000 PSI at failure, which is an order of magnitude better than object printed by a conventional 3D printer.

FIG. 4C shows another embodiment. This embodiment is based on a heuristic that the spherical pressure tank 420 can be constructed by winding parallel extrusions in the XY 423, XZ 422, and YZ 421 planes, or by winding analogous to the directions of the lines of latitude and longitude on a globe. Although these extrusion patterns, with nonparallel ribbons of materials, may be less optimal in terms of strength to weight ratio, the patterns are simpler to calculate, analyze, and program the appropriate five degree of freedom motions. In the case of nonparallel depositing, the material can be distributed according to a weighted sum of local stresses on the object.

Analysis

Figure 5:
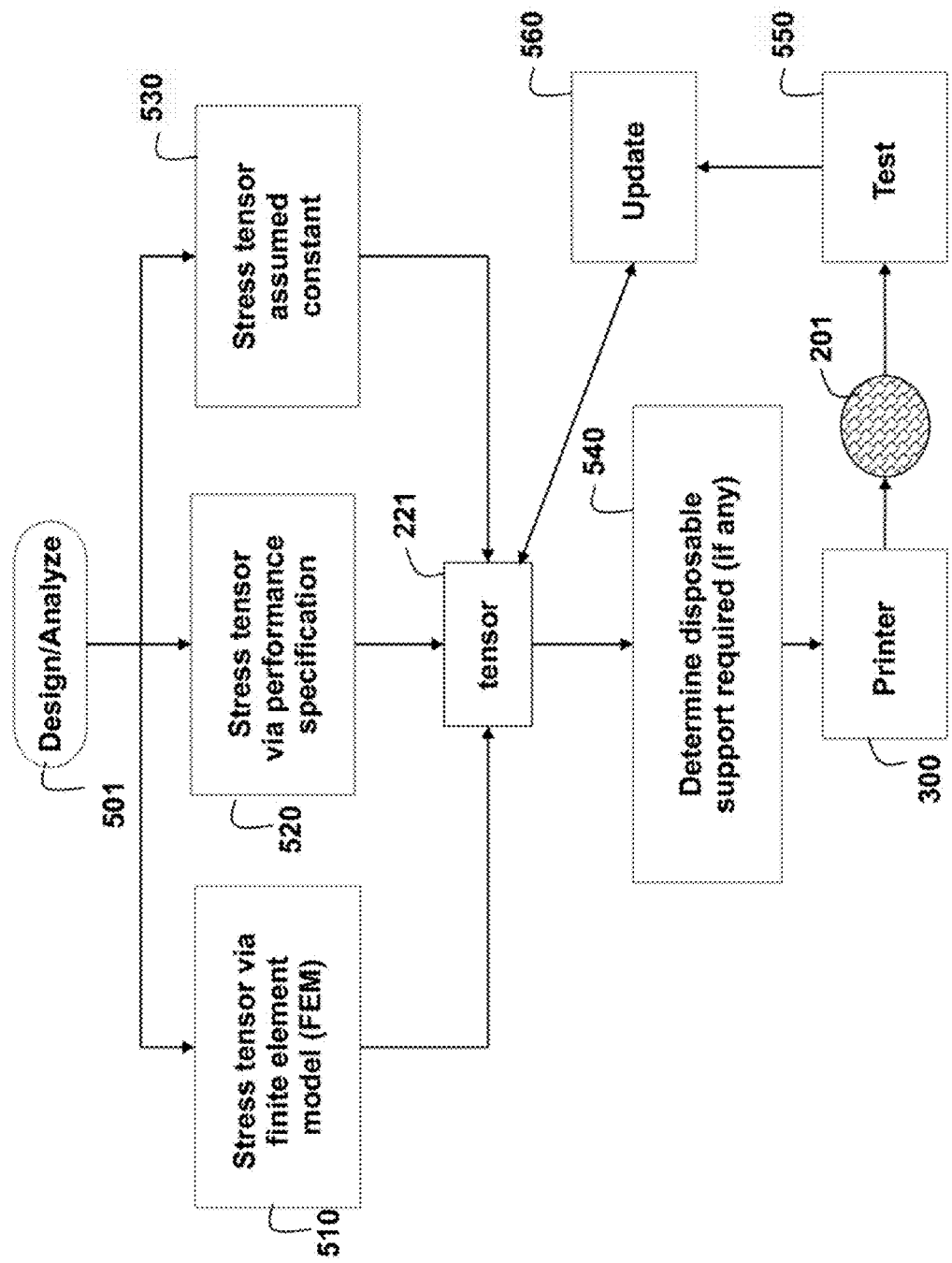
FIG. 5 is a flow diagram of a method for additive manufacturing based on tensile strength according to embodiments of the invention.

FIG. 5 shows design and analysis 501 alternatives. The stress tensor 221 can be determined by a finite element method (FEM) 510. FEM is a numerical technique for determining approximate solutions to boundary value problems. FEM uses variational methods to minimize an error function and produce a stable solution.

Alternatively, the tensor can be determined according to a stress tensor per specification 520, or assumed 530 to be constant, uniform or selected from a predetermined library of typical shapes. The appropriate disposable support 309 can also be designed the same way. Then, the object 201 can be constructed by the printer 300.

Subsequently, the object can be tested 550 to destruction. A failure mode of the tested object can then be used to update 560 the actual in-use stress tensor, and the updated stress tensor is then used to produce a more optimal laydown pattern for the next generation of object. This iterative process can be repeated as desired, allowing further generations of objects with strengths dependent on actual in-use failure modes to be automatically designed.

In another embodiment, the stress tensor is determined intuitively, at some convenient, level of detail, for the preferred orientations of various ribbons within the desired object. For example, a designer might know that the object will be used as a hydraulic cylinder with a high internal pressure, and will be put into axial compression by an external frame, and thereby needing only a small amount of axial tensile strength. Thus, the designer would specify most if not all of the ribbon laydowns to be axis-symmetric circular paths around the interior of the cylinder.

Figure 6:
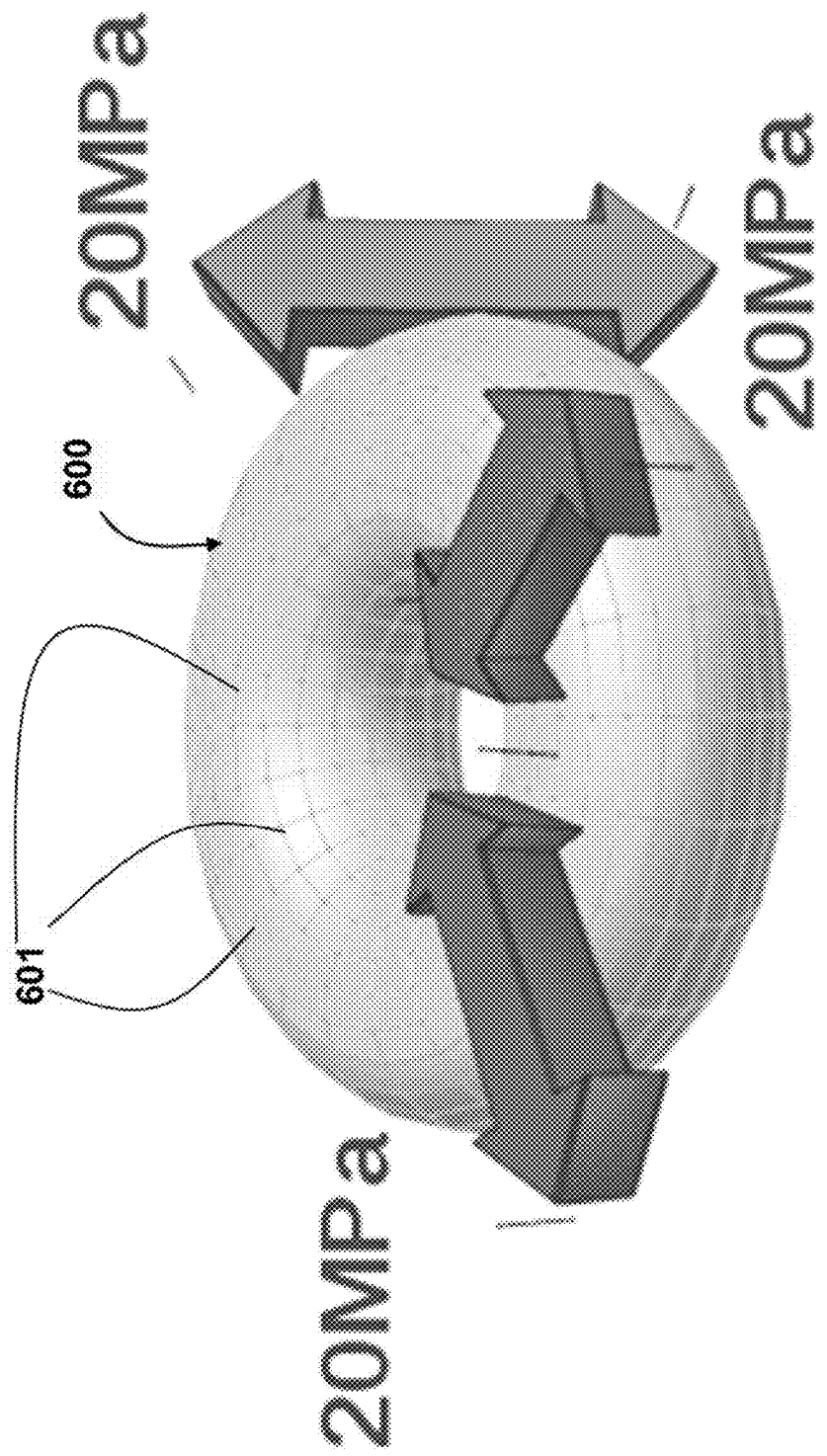
FIG. 6. is a schematic of isotropic tensile strength characteristics according to embodiments of the invention.

FIG. 6 shows an object 600 in the shape of a torus with corresponding tensile strengths for the various axes according to the embodiments. These extrusion patterns are impossible to reproduce with a conventional 3D printer.

Alternative Embodiments

Figure 7E:
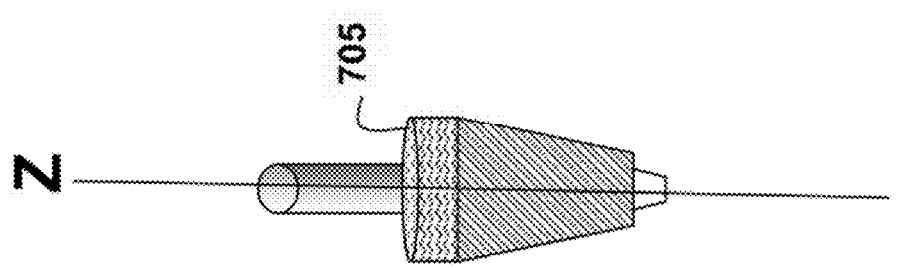
FIGS. 7A, 7B, 7C, 7D and 7E are schematics of extruder components according to embodiments of the invention.
Figure 7D:
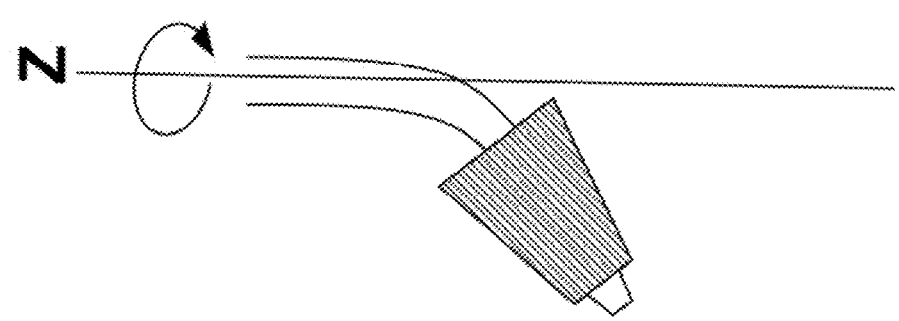
Figure 7C:
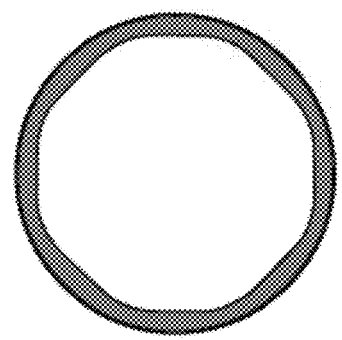
Figure 7B:
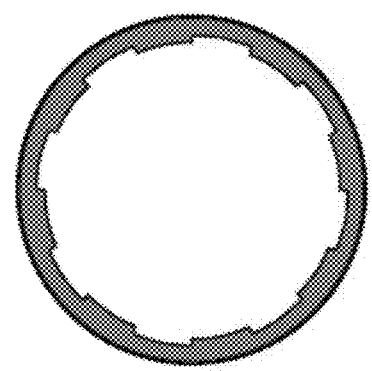
Figure 7A:
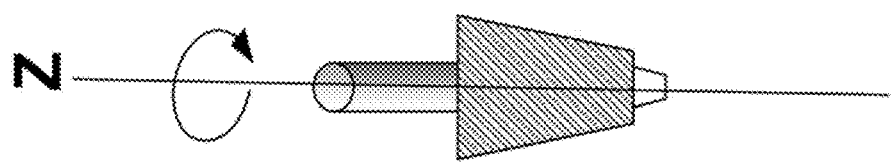

FIG. 7A shows an arrangement where the extruder is be rotated about the Z axis during extrusion to put a "twist" in the ribbon material, similar to the way a thread is spun to increase its tensile strength. If the material has a circular cross section, the extruder can include interior rectangular or polygonal riffling as shown in FIGS. 7B and 7C. The riffling imparts a preferred orientation or microstructure to the extruded material.

FIG. 7D shows a configuration wherein the extruder is "J" shaped and can rotate about the Z axis. This way, the extruder can deposit material in otherwise hard to reach interior portions of the object.

In one alternative embodiment, the "path" followed by the nozzle can be optimized in various ways, e.g., to minimize production time, maximize strength, minimize material usages.

In another embodiment as shown in FIG. 7E, the extrusion is combined, with ultrasonic bonding, whereby high-frequency ultrasonic acoustic energy is locally applied to the material using a transducer 705 to achieve a solid-state "bond." This is useful with thermoplastics materials, especially for extruding and joining dissimilar materials. This ultrasonic bonding assist technique can be used selectively, such as to produce a "strong" object (produced with ultrasonic assist) built on a highly frangible support (produced without ultrasonic assist), i.e., the printer produces material bonds with various strengths.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An apparatus for additively manufacturing an object from a thermoplastic material having dimensions, comprising:
an extruder configured to move, with respect to the object while depositing the thermoplastic material, wherein the deposited thermoplastic material exhibits an anisotropic tensile strength along an axis of a direction of deposition, and a pattern of the depositing is selected to deposit the thermoplastic material in the object according to, in a stress analysis of a predetermined object model of the object, different tensile loads directed along axes of the object, according to an array of predetermined 3D tensile stresses of the predetermined object model of the object under stress, while substantially maintaining the same dimensions of the object as configured for manufacture.

2. The apparatus of claim 1, further comprising:
a gantry movable along X, Y and Z axes;
a trunnion table, movable about A and B axes, mounted on the gantry; and
a platen mounted on the trunnion table, wherein the extruder deposits the thermoplastic material on the platen while moving the gantry and trunnion table.

3. The apparatus of claim 1, wherein the object includes a removable support.

4. The apparatus of claim 3, wherein the object has a greater tensile strength than the removable support.

5. The apparatus of claim 1, further comprising:
a processor configured to analyze the predetermined object model of the object and to produce the array of stress tensors for the object.

6. The apparatus of claim 5, wherein the object has a near optimal strength to weight ratio, and near constant wall thickness.

7. The apparatus of claim 1, wherein a pattern for the depositing the thermoplastic material is determined stochastically.

8. The apparatus of claim 1, wherein a pattern for the depositing the thermoplastic material is determined deterministically.

9. The apparatus of claim 5, wherein the array of stress tensors are determined using a finite element model.

10. The apparatus of claim 5, wherein the array of stress tensors are determined by a performance specification of the object.

11. The apparatus of claim 5, wherein the array of stress tensors are selected from a predetermined library of shapes.

12. The apparatus of claim 5, wherein the object is tested to destruction, and the array of stress tensors are updated according to a failure mode.

13. The apparatus of claim 12, wherein the depositing, testing and updating is performed iteratively.

14. The apparatus of claim 1, wherein the extruder is rotatable.

15. The apparatus of claim 14, wherein the extruder is J shaped.

16. The apparatus of claim 14, wherein the extruder includes rifling.

17. The apparatus of claim 1, wherein a path of the extruder is optimized in order of an increasing Z height.

18. The apparatus of claim 1, wherein a path of the extruder is optimized for minimizing a production time.

19. The apparatus of claim 1, wherein a path of the extruder is optimized for maximizing a strength of the object.

20. The apparatus of claim 1, wherein a path of the extruder is optimized for minimizing material usages.

21. The apparatus of claim 1, wherein the extruder includes an ultrasonic transducer to assist bonding of the thermoplastic material, such that an ultrasonic acoustic energy is applied to the thermoplastic material to achieve a solid-state bond.

22. A method for additively manufacturing an object from a thermoplastic material having dimensions, comprising the steps of:

employing a processor executing computer executable instructions stored on a computer readable memory to facilitate performing the steps of:

using a computer aided design (CAD) module to generate a model of the object;

analyzing the model to determine distributions of stresses present when the object is under stress, resulting in providing volumetric stress tensor data;

moving an extruder linearly along three orthogonal axes and rotationally around at least one of the axes; and depositing the thermoplastic material while moving to manufacture the object, wherein the deposited thermoplastic material exhibits an anisotropic tensile strength along an axis of a direction of deposition, and a pattern of the depositing is selected to deposit the thermoplastic material in the object according to, in a stress analysis of a model of the object, different tensile loads directed along axes of the object, according to an array of predetermined 3D tensile stresses of the model of the object under stress via the volumetric stress tensor data, while substantially maintaining the same dimensions of the object as configured for manufacture.

23. The apparatus of claim 1, wherein the pattern of the depositing optimizes a strength of the object with respect to a stress tensor.

24. The apparatus of claim 1, wherein the object is a spherical pressure tank, such that the pattern of the depositing includes a tessellation by geometric dispersions to produce a constant wall thickness that optimizes a strength to a weight ratio.

* * * * *